(12) United States Patent
Chin

(10) Patent No.: US 12,121,029 B2
(45) Date of Patent: Oct. 22, 2024

(54) ANTIMICROBIAL PRODUCTS CONTAINING SILVER AND COPPER PARTICLES

(71) Applicant: SILVER PARTICLE COMPANY LIMITED, Cheung Sha Wan (HK)

(72) Inventor: Yuen Keung Raymond Chin, Cheung Sha Wan (HK)

(73) Assignee: SILVER PARTICLE COMPANY LIMITED, Cheung Sha Wan (HK)

( * ) Notice: Subject to any disclaimer, the term of this patent is extended or adjusted under 35 U.S.C. 154(b) by 41 days.

(21) Appl. No.: 17/566,977

(22) Filed: Dec. 31, 2021

(65) Prior Publication Data

US 2023/0097291 A1   Mar. 30, 2023

(30) Foreign Application Priority Data

Sep. 30, 2021   (CN) .......................... 202111156863.4

(51) Int. Cl.

| | |
|---|---|
| *A01N 59/20* | (2006.01) |
| *A01N 25/08* | (2006.01) |
| *A01N 59/16* | (2006.01) |
| *A01P 1/00* | (2006.01) |
| *C23C 4/06* | (2016.01) |
| *C23C 4/129* | (2016.01) |
| *C23C 4/134* | (2016.01) |

(52) U.S. Cl.
CPC .............. *A01N 59/20* (2013.01); *A01N 25/08* (2013.01); *A01N 59/16* (2013.01); *A01P 1/00* (2021.08); *C23C 4/06* (2013.01); *C23C 4/129* (2016.01); *C23C 4/134* (2016.01)

(58) Field of Classification Search
CPC ........ A01N 59/20; A01N 25/08; A01N 59/16; A01P 1/00; C23C 4/06; C23C 4/129; C23C 4/134
See application file for complete search history.

(56) References Cited

U.S. PATENT DOCUMENTS

| | | | | |
|---|---|---|---|---|
| 3,607,343 A | * | 9/1971 | Longo ....................... | C23C 4/04 |
| | | | | 428/404 |
| 2022/0168473 A1 | * | 6/2022 | Aksu ..................... | A61L 27/427 |

* cited by examiner

*Primary Examiner* — Snigdha Maewall

(57) ABSTRACT

This invention relates to an antimicrobial product containing silver-copper particles and its preparation method. The product includes a substrate and positively charged silver particles with a particle size of 15 μm to 50 μm, and a positively charged copper particle with a particle size of 10 μm to 50 μm, wherein the copper particle size ratio to the silver particle is 0.8 to 1.2. The silver particle, the copper particle and the substrate are combined by means of semi-fused sintering, wherein the ratio of the silver particle to the copper particle is 40:60 to 95:5. The sum of the substrate, the silver particles and the total particles of the copper particles is less than or equal to 10%.

17 Claims, No Drawings

ANTIMICROBIAL PRODUCTS CONTAINING SILVER AND COPPER PARTICLES

TECHNICAL SCOPE

This application relates to an antimicrobial product, and more specifically, to an antimicrobial product containing silver particles and copper particles combined in a semi-fused sintering manner.

BACKGROUND

In recent decades, nano-silver has become the most commonly used material in sterilization products. However, more and more studies have shown that the widespread use of nano-silver may cause serious harm to human health and the environment. A recent study reviewed the current global research on the toxicity of nanoparticles and pointed out that nano-silver particles may be harmful to the environment. In addition, when nano-silver is used in products that are in direct contact with the human body, the nano-silver will penetrate the human skin and cause direct harm to the human body. In this regard, the inventor of this case has adopted positively charged micron silver particles to avoid the harm caused by small-volume nano-silver particles while realizing the killing of microorganisms.

However, as the price of silver continues to rise and the amount of micron silver coating itself is large, the price of products coated with micron silver coating rises accordingly. As we all know, copper is also a kind of metal with bactericidal properties, and the price is lower than silver. As a substitute for silver, copper has begun to be widely used in daily life, for example, towels, sheets, filter elements containing copper fibers, etc. However, the sterilization effect of copper is lower than that of silver, so relatively high sterilization is required. In the case of efficacy, nano-silver particles still need to be used.

The inventor in this case tried to mix copper and silver into an antimicrobial coating, and under the condition of ensuring a more efficient antimicrobial effect, the cost was reduced as much as possible, thus completing the present invention.

SUMMARY OF THE INVENTION

In the first aspect of this invention, there is provided an antimicrobial product containing silver-copper particles, the product comprising a substrate and positively charged silver particles with a particle size of 15 µm to 50 µm and a particle size of 10 µm to 50 µm. Positively charged copper particles, wherein the particle size ratio of the silver particles to the copper particles is 0.8 to 1.2, and the silver particles, the copper particles and the substrate are semi-fused sintered. The method is combined; wherein the ratio of the number of silver particles to the copper particles is 40:60 to 95:5, and based on the total number of particles of the substrate, the silver particles and the copper particles, the the sum of the silver particles and the copper particles is less than or equal to 10%.

In one example, based on the total number of particles of the substrate, the silver particles and the copper particles, the sum of the silver particles and the copper particles is less than or equal to 8%. In another example, based on the total number of particles of the substrate, the silver particles and the copper particles, the sum of the silver particles and the copper particles is less than or equal to 5%. In one example, the particle size of the silver particles is 20 µm to 45 µm. In another example, the silver particles have a particle size of 25 µm to 40 µm. In yet another example, the particle size of the silver particles is 28 µm to 38 µm. In one example, the particle size of the copper particles is 10 µm to 45 µm. In another example, the particle size of the copper particles is 15 µm to 40 µm. In another example, the particle size of the copper particles is 22 µm to 38 µm.

In one example, the ratio of the number of silver particles to the number of copper particles is 50:50 to 95:5. In another example, the ratio of the number of silver particles to the number of copper particles is 55:45 to 90:10. In another example, the ratio of the number of silver particles to the number of copper particles is 60:40 to 80:20.

In one example, elemental silver particles and elemental copper particles undergo high velocity thermal spray, high velocity plasma spray or low velocity flame spray to become positively charged silver particles and positively charged copper particles. In a further example, in the high velocity thermal spray, high velocity plasma spray, the particle velocity is greater than 340 m/s, and in the low velocity flame spray, the particle velocity is less than or equal to 50 m/s.

In one example, silver particles, copper particles, and the base material are mixed together, and then semi-fused bond by high velocity thermal spray, high velocity plasma spray or low velocity flame spray. In another example, the substrate is selected from nickel-based tungsten carbide, cobalt-based tungsten carbide, nickel-chromium chromium carbide, nickel-based alloys, cobalt-based alloys, and combinations thereof, and the silver particles, copper particles, and the substrate are mixed together, then through high velocity thermal spray or high velocity plasma spray and form semi-fused bonding. In yet another example, the substrate is selected from glass beads, calcium carbonate, ceramics, and combinations thereof, and silver particles, copper particles, and the substrate are mixed together, and then form semi-fused bond by low velocity flame spraying.

In one example, the antimicrobial article herein further includes a polymer film disposed on the outer surface. In another example, the thickness of the polymer film is 0.5 µm to 60 µm.

Another aspect of this invention provides a method for preparing a product containing an antimicrobial product, the method comprising: mixing silver particles, copper particles and substrate particles uniformly to obtain a particle mixture, wherein the substrate is selected from nickel-based carbonization when tungsten, cobalt-based tungsten carbide, nickel-chromium chromium carbide, nickel-based alloys, cobalt-based alloys and combinations thereof are used, the particulate mixture is directly sprayed on the metal substrate by high velocity thermal spray or high velocity plasma spray, to form antimicrobial coating to achieve the product; when the substrate is selected from glass beads, calcium carbonate, ceramics and combinations thereof, the particulate mixture is sprayed into the collection tank by low velocity flame spray to become antimicrobial powder, and then the antimicrobial powder and the carrier are formed into the product through spinning, bonding, coating, embedding, extrusion or extrusion processes.

In a specific example, the article prepared by the above method comprises a substrate and positively charged silver particles with a particle size of 15 µm to 50 µm and positively charged copper particles with a particle size of 10 µm to 50 µm, wherein the the particle size ratio of the silver particles to the copper particles is 0.8 to 1.2, and the silver particles, the copper particles and the substrate are combined by means of semi-fused sintering; wherein the silver particles and the particle number ratio of the copper particles is 40:60 to 95:5, and based on the total number of the substrate, the silver particles, and the copper particles, the sum of the silver particles and the copper particles Less than or equal to 10%.

In one example, based on the total number of particles of the substrate, the silver particles and the copper particles, the sum of the silver particles and the copper particles is less than or equal to 8%. In another example, based on the total number of particles of the substrate, the silver particles and the copper particles, the sum of the silver particles and the copper particles is less than or equal to 5%. In one example, the particle size of the silver particles is 20 μm to 45 μm. In another example, the silver particles have a particle size of 25 μm to 40 μm. In yet another example, the particle size of the silver particles is 28 μm to 38 μm. In one example, the particle size of the copper particles is 10 μm to 45 μm. In another example, the particle size of the copper particles is 15 μm to 40 μm. In another example, the particle size of the copper particles is 22 μm to 38 μm.

In one example, the ratio of the number of silver particles to the number of copper particles is 50:50 to 95:5. In another example, the ratio of the number of silver particles to the number of copper particles is 55:45 to 90:10. In another example, the ratio of the number of silver particles to the number of copper particles is 60:40 to 80:20.

In one example, elemental silver particles and elemental copper particles undergo high velocity thermal spray, high velocity plasma spray, or low velocity flame spray to become positively charged silver particles and positively charged copper particles. In a further example, in the high velocity thermal spray or high velocity plasma spray, the particle velocity is greater than 340 m/s, and in the low velocity flame spray, the particle velocity is less than or equal to 50 m/s.

In one example, silver particles, copper particles, and the base material are mixed together, and then form semi-fused bond by high velocity thermal spray, high velocity plasma spray or low velocity flame spray. In another example, the substrate is selected from nickel-based tungsten carbide, cobalt-based tungsten carbide, nickel-chromium chromium carbide, nickel-based alloys, cobalt-based alloys, and combinations thereof, and the silver particles, copper particles, and the substrate are mixed together, then through high velocity thermal spray or high velocity plasma spray and form semi-fused bonding. In yet another example, the substrate is selected from glass beads, calcium carbonate, ceramics, and combinations thereof, and silver particles, copper particles, and the substrate are mixed together, and then form semi-fused bond by low velocity flame spray.

In one example, the antimicrobial article herein further includes a polymer film disposed on the outer surface. In another example, the thickness of the polymer film is 0.5 μm to 60 μm.

The inventor of this case surprisingly found that the copper-silver coating with a specific particle size range and a specific particle number ratio obtained by the semi-fuse method used herein can achieve approximately the same antimicrobial properties and effect as a pure silver coating of the same particle size, and in turn, an antimicrobial product with excellent antimicrobial properties and relatively low price can be obtained.

Implementation

The following description includes certain specific details for a thorough understanding of various disclosed examples. However, those skilled in the relevant art should understand that one or more of these specific details may not be required, or other methods, ingredients, materials, etc. may be used to practice the implementation.

Unless the context requires otherwise, in the following specification and claims, the terms "including" shall be interpreted as open-ended and inclusive meanings, that is, shall be interpreted as "including, but not limited to".

The "one example", or "an example", or "another example", or "certain examples" mentioned throughout the specification refers to the specific features and structures related to the example or the characteristic is included in at least one example. Therefore, the phrases "one example," "an example," "another example," or "certain examples" appearing in various places throughout the specification do not necessarily all refer to the same example. In addition, specific features, structures, or characteristics can be combined in any suitable manner in one or more examples.

It should be noted that the amounts of all expression components and numerical values indicating reaction conditions used in the specification and claims should be understood as being modified by the term "about". Therefore, unless stated to the contrary, the numerical parameters given in this specification and the appended claims are approximate values and can be changed according to the required properties sought by this application. There is no intention to limit the application of the principle of equivalence to the scope of the claims, and each numerical parameter should be understood according to significant figures and common rounding methods.

Definition

Unless expressly stated to the contrary, the terms used in the specification and claims have the following meanings:

As used herein, the term "antimicrobial" or "antimicrobial effect" refers to the general term for the effect of inhibiting or killing microorganisms (such as bacteria, fungi, viruses, etc.). The term "inhibiting microorganisms" refers to the effect of inhibiting the growth and reproduction of microorganisms. The term "killing microorganisms" refers to the effect of killing microbial vegetative bodies and propagules. In this article, microorganisms mainly refer to bacteria, fungi, viruses, etc.

The terms "silver particles" and "copper particles" used herein refer to silver micron-sized particles and copper micron-sized particles that are round or round-like (such as elliptical or irregular round). Based on this, wire (or thread), sheet (or foil), rod (or rod), etc. are not included in the scope of "particles" used herein. The term "particle size" as used herein refers to the diameter of a round particle, and when the particle is round-like, it refers to the average of the longest diameter and the shortest diameter.

In addition, the "silver particles" and "copper particles" used herein mainly refer to elemental silver particles and elemental copper particles, and do not include silver ions or silver compounds and copper ions or copper compounds. Of course, in the actual production and application process, the silver particles and copper particles may also contain an indispensable amount of impurities (for example, less than 1% by weight), which can be understood and recognized by those skilled in the art.

The term "basically" or "about" as used herein means that the variation of the specified value is less than ±5%, preferably ±3%, and more preferably ±1% of the specified value. For example, "the content is basically unchanged" means that the amount of change in the content of the particles referred to is less than ±5%, preferably ±3%, and more preferably ±1% of the initial content. "Basically no particles or ions are released" means that the weight of the released particles or ions is less than ±1%, more preferably ±0.5%, and even more preferably ±0.1% of the weight of the original particles. Similarly, when the term "basically" modifies other values, it should be interpreted in the same way. In addition, when the term "about" modifies a numerical value, it should also have the same interpretation as "basically".

No Anti-Microbial Mechanism of Silver-Copper Particles or Silver-Copper Ions Released In this application, metallic silver-copper particles are bound on the substrate or covered under the surface film, and the ion group electric field is used to inhibit or kill microorganisms, and in the process of inhibiting or killing microorganisms, there is basically no ions or particles released, thereby avoiding harm to the human body or polluting the environment. In the actual use process, it is necessary to keep the metal silver-copper particles in a positive state, and there will be no negatively charged ions coordinated with them. The presence of negatively charged ions will affect the electric field distribution of silver-copper, which will cause it to sterilize ineffectively.

Detection Method of Trace Particles or Ions

Detect whether the antimicrobial products in this application release silver-copper particles or ion completed according to the US Environmental Protection Agency (EPA) Method for Determining Trace Elements in Water and Waste by Inductively Coupled Plasma-Mass Spectrometry (EPA 200.8: 1994, ICP-MS), Antimicrobial Performance Test Method and Antimicrobial Effect Antimicrobial Effect The antimicrobial effect of antimicrobial products is obtained through the value of antimicrobial properties, and the detection method is ISO21702-2019 and JIS Z 2801: 2010.

Antimicrobial Performance Test Method

1. Viruses and Bacteria for Testing

Influenza A Virus H1N1 and *Staphylococcus aureus* (ATCC6538P). The above test bacteria are designated and provided by the Guangzhou Branch of SGS Standard Technical Service Co., Ltd.

2. Testing Standards

ISO21702-2019 and JIS Z 2801:2010

Antimicrobial Products

The antimicrobial product of the present invention comprises positively charged silver-copper particles and a substrate supporting these particles, wherein the positively charged silver particles have a particle size of 15 μm to 50 μm and the positively charged copper particles have a particle size of 10 μm to 50 μm. Furthermore, the ratio of the particle diameter of the silver particles to the particle diameter of the copper particles is 0.8 to ~1.2, and preferably, the particle diameters of the two are about the same.

In the antimicrobial product of this invention, the silver particles, copper particles and the substrate are combined by semi-fused sintering. For example, the silver particles, copper particles and the substrate particles are subjected to high velocity thermal spray, high velocity plasma spray or low velocity flame spray. Sprayed into the collection tank, these particles are combined in a semi-fused sintering manner. Here, "semi-fused" means that during the spraying process, only the outer surface of these particles melts, while the inner core part is still in solid form. Such a treatment method can remove the electrons in the outermost layer of the silver/copper particles, thereby forming positively charged silver particles and copper particles. This processing method is different from the common processing method. In the common processing method, the metal particles are melted instantaneously, and then ejected in the form of droplets. During the process from the nozzle of the spray gun to the collection tank, the metal droplets are formed by cooling particle.

In one example, the ratio of the number of silver particles to copper particles is 40:60 to 95:5. In another example, the ratio of the number of silver particles to copper particles is 50:50 to 90:10. In yet another example, the ratio of the number of silver particles to copper particles is 55:45 to 85:15. In a further example, the ratio of the number of silver particles to the number of copper particles is 60:40 to 80:20.

In one example, based on the total number of the substrate, the silver particles and the copper particles, the sum of the silver particles and the copper particles is less than or equal to 10%. In another example, based on the total number of the substrate, the silver particles and the copper particles, the sum of the silver particles and the copper particles is less than or equal to 8%. In another example, the sum of the silver particles and the copper particles is less than or equal to 5% based on the total number of the substrate, the silver particles, and the copper particles.

In one example, the particle size of the silver particles is 20 μm to 45 μm. In another example, the particle size of the silver particles is 25 μm to 40 μm. In yet another example, the particle size of the silver particles is 28 μm to 38 μm. In one example, the particle size of the copper particles is 10 μm to 45 μm. In another example, the particle size of the copper particles is 15 μm to 40 μm, for example, 20 μm to 40 μm. In yet another example, the particle size of the copper particles is 22 μm to 38 μm. Here, the particle size ratio of the silver particles to the copper particles is 0.8 to 1.2, preferably 0.9 to 1.1, and even more preferably 1:1.

In one example, the substrate is selected from: metals, such as nickel-based tungsten carbide, cobalt-based tungsten carbide, nickel-chromium chromium carbide, nickel-based alloys, cobalt-based alloys; non-metals, such as glass beads, calcium carbonate, ceramics; and combination of any of these. Preferably, the substrate is a combination of similar materials, for example, any combination of metal substrates selected from nickel-based tungsten carbide, cobalt-based tungsten carbide, nickel-chromium chromium carbide, nickel-based alloys, and cobalt-based alloys, or selected from glass beads and calcium carbonate, or any combination of calcium carbonate and ceramic non-metal substrates.

In one example, the particle size of the substrate is larger than the particle size of the silver particles and the copper particles, for example, the particle size of the silver particles or copper particles is 1.1 to 1.8 times, for example, 1.2 to 1.6 times. In another example, the particle size of the substrate is 25 μm to 60 μm, e.g., 30 μm to 58 μm, 35 μm to 55 μm, or 38 μm to 52 μm. In one example, the antimicrobial article herein further includes a polymer film disposed on the outer surface. In another example, the thickness of the polymer film is 0.5 µm to 60 µm, such as 1 µm, 5 µm, 10 µm, 15 µm, 20 µm, 25 µm, 30 µm, 35 µm, or 40 µm.

Preparation

The antimicrobial product of the present invention can be prepared by the method provided herein, and the method includes: uniformly mixing silver particles, copper particles, and substrate particles to obtain a particle mixture, and subjecting the resulting mixed particles to high velocity thermal spray, high velocity plasma spray (for example, spray on metal) or low velocity flame spray, and then collect to obtain antimicrobial products. In a further example, the substrate is selected from nickel-based tungsten carbide, cobalt-based tungsten carbide, nickel-chromium chromium carbide, nickel-based alloys, cobalt-based alloys, and combinations thereof, and the resulting particulate mixture is passed through high velocity thermal spray or high velocity plasma spray and directly spray on the metal substrate to form an antimicrobial coating, thereby obtaining an antimicrobial product. In another further example, the substrate is selected from glass beads, calcium carbonate, ceramics, and combinations thereof, and the resulting particulate mixture is sprayed into a collection tank by low velocity flame spray to obtain an antimicrobial powder, and then the antimicrobial product is formed by spinning, bonding, coating, embedding, extrusion or extrusion process with the carrier.

In one example, elemental silver particles and elemental copper particles undergo high velocity thermal spray, high velocity plasma spray, or low velocity flame spray to become positively charged silver particles and positively charged copper particles. In a further example, in the high velocity thermal spray or high velocity plasma spray, the particle velocity is greater than 340 m/s, and in the low velocity flame spray, the particle velocity is less than or equal to 50 m/s. In one example, silver particles, copper particles, and the base material are mixed together, and then form semi-fused bond by high velocity thermal spray, high velocity plasma spray or low velocity flame spray. For example, the low velocity flame spray can be oxygen and acetylene gas flame for sintering.

In one example, the substrate is selected from nickel-based tungsten carbide, cobalt-based tungsten carbide, nickel-chromium chromium carbide, nickel-based alloys, cobalt-based alloys, and combinations thereof, and the silver particles, copper particles, and the substrate are mixed in together, then through high velocity thermal spray or high velocity plasma spray and form semi-fused bonding. In another example, the substrate is selected from glass beads, calcium carbonate, ceramics, and combinations thereof, and silver particles, copper particles, and the substrate are mixed together, and then form semi-fused bonded by low velocity flame spray.

In this application, due to the large particle size of the powder, and by adjusting the spray speed, the powder particles can be sprayed into a semi-fused state, but in the case of too small particle size, the powder will melt even if it is sprayed at high speed into a liquid form, when solidified from a liquid to a solid, an electrically neutral powder, such as silver ions or cuprous ions, is obtained. Specifically, the inventor of this case found that the atomic structure and surface melting point of silver and copper are very similar, and the atomic structure of silver and copper are also the same with only one electron in the outer orbital. The melting point of silver is 961.78° C., while the melting point of copper is 1083.4° C. During the experiment, the inventor found that during high-temperature sintering (approximately 3200° C.), the mixed particles were immediately cooled by the outside air after passing through the flame at high speed. At this time, the number of negatively charged electrons of silver and copper changed and then became positively charged. The antibacterial and virus-killing ability of the silver-copper particles is enhanced, resulting in a synergistic effect.

The inventor of this case found that the copper-silver coating with a specific particle size range and a specific particle number ratio obtained by the semi-fused method used herein can achieve approximately the same antimicrobial effect as a pure silver coating with the same particle size. Specifically, when the copper content is high, the bactericidal (or anti-viral) effect of the copper-silver coating is only a little lower than that of the pure silver coating, and compared with the pure copper coating, the bactericidal (or anti-viral) effect is significantly higher. When the copper content is low, the copper-silver coating is about the same or slightly improved compared with the pure silver coating. In terms of product prices, the introduction of copper can greatly reduce the price of antimicrobial products.

EXAMPLES

The below specific implementations of this application as disclosed will be explained in detail through the following examples, so as to better understand the various aspects and advantages of this application. However, it should be understood that the following examples are non-limiting and are only used to illustrate certain implementations of this application.

In the examples herein, all materials are commercially available products. Specifically, 450-800 mesh silver powder and copper powder were purchased from Shanghai Didan Metal Materials Co., Ltd., glass beads were purchased from Singapore Pan Abrasives grade AQ, and tungsten carbide was purchased from Praxair, USA. Powder 1350vm (cobalt-based), 1310vm (nickel-based).

Example 1

Weigh silver powder (38 µm), copper powder (38 µm) and tungsten carbide powder (45 µm), mix them evenly at a particle ratio of 5%:3%:92%, and add them into the powder feeder, and delivery to high velocity flame spray gun. Then, the stainless-steel sheet target is placed and clamped tightly. The uniformly mixed powder mixture is sprayed directly onto the stainless-steel sheet in the target, the particle at a sound speed (greater than 340 m/s) through a spray gun, to form a coating with a thickness of 200 µm.

Example 2

Weigh silver powder (28 µm), copper powder (27 µm) and tungsten carbide powder (41 µm), mix them evenly at a particle ratio of 7%:2%:91%, and add them into the powder feeder, and delivery to high velocity flame spray gun. Then, the stainless-steel sheet target is placed and clamped tightly. The uniformly mixed powder mixture is sprayed directly onto the stainless-steel sheet in the target, the particle at a sound speed (greater than 340 m/s) through a spray gun, to form a coating with a thickness of 200 µm.

Example 3

Weigh silver powder (25 µm), copper powder (25 µm) and tungsten carbide powder (38 µm), mix them evenly at a particle ratio of 4%:3%:93%, and add them to the powder feeder, and delivery to high velocity flame spray gun. Then, the stainless-steel sheet target is placed and clamped tightly. The uniformly mixed powder mixture is sprayed directly onto the stainless-steel sheet in the target, the particle at a sound speed (greater than 340 m/s) through a spray gun, to form a coating with a thickness of 200 μm.

Example 4

Weigh silver powder (25 μm), copper powder (25 μm) and glass beads (38 μm), mix them evenly at a particle ratio of 4%:4%:92%, and add them to the powder feeder, and delivery to the oxygen-acetylene spray gun. Then, the evenly mixed powder mixture is sprayed into the collection tank through the spray gun to obtain the antibacterial powder.

Example 5

Weigh silver powder (38 μm), copper powder (38 μm) and ceramic powder (52 μm), mix them evenly at a particle ratio of 7%:2%:91%, and add them to the powder feeder, and delivery to the oxygen-acetylene spray gun. Then, the evenly mixed powder mixture is sprayed into the collection tank through the spray gun to obtain the antibacterial powder.

Comparative Example 1

Weigh silver powder (38 μm) and tungsten carbide powder (45 μm), mix them evenly at a particle ratio of 5%:95%, and add them to the powder feeder, and delivery to high velocity flame spray gun. Then, the stainless-steel sheet target is placed and clamped tightly. The uniformly mixed powder mixture is sprayed directly onto the stainless-steel sheet in the target, the particle at a sound speed (greater than 340 m/s) through a spray gun, to form a coating with a thickness of 200 μm.

Comparative Example 2

Weigh silver powder (38 μm) and ceramic powder (52 μm), mix them evenly at a particle ratio of 9%:91%, and add them to the powder feeder, and delivery to the oxygen-acetylene spray gun. Then, the evenly mixed powder mixture is sprayed into the collection tank through the spray gun to obtain the antibacterial powder.

Test Case 1

The silver copper tungsten carbide coating prepared in Example 1 was used, the test bacteria was influenza A virus H1N1, and the host cells were MDCK cells. The test time is 12 hours and the test method is ISO21702:2019. The test results are shown in Table 1 below. In addition, the coating in Comparative Example 1 was used as a control group, and the test results are shown in Table 2 below:

TABLE 1

Silver Copper-Carrier Coating

| Virus | Group | 0 Hour Virus Titer | 12 Hours Experimental Group Virus Titer |
|---|---|---|---|
| Influenza A Virus | 1 | 7.33 | 5.67 |
| H1N1 | 2 | 7.00 | 6.00 |
| Host MDCK Cells | 3 | 7.00 | 5.67 |
| Average Ig ($TCID_{50}$/mL). | | 7.11 | 5.78 |
| Average Ig ($TCID_{50}/cm^2$). | | 6.91 | 5.58 |
| Kill Rate (%) | | | 78.12 |

TABLE 2

Silver- Carrier Coating

| Virus | Inoculation concentration (cfu/mL) | Average Virus Titer After 12 Hours of Exposure | | | Kill Rate |
|---|---|---|---|---|---|
| | | Test Group | 1 | 2 | |
| Influenza A Virus H1N1 | $1 \times 10^7$ | Sample | 6.50 | 6.67 | 44.78% |
| | | Control Sample | 6.83 | 7.00 | |

Test Case 2

The antibacterial powder prepared in Example 5 was adhered to a plastic film to form a 200 μm coating, which was used as a sample. The test bacteria are *Staphylococcus aureus*, and the test method is JIS Z 2801:2010. The test results are shown in Tables 3 to 5 below. In addition, the antibacterial powder of Comparative Example 2 was used as a control, and the test results are shown in Table 6 below.

TABLE 3

SilverCopper + Carrier 0.5 HourTest

| Experimental Strain | Concentration of Inoculum Solution (cfu/mL) | amount Inoculum (mL) | | 0 hours | The average number of logarithmic values of the number of bacteria (cfu/cm2) obtained after different exposure times 0.5 hours | Kill Rate |
|---|---|---|---|---|---|---|
| *Staphylococcus aureus* | $1.4 \times 10^5$ | 0.2 | Sample | / | $4.1 \times 10^4$ | 70.71% |
| | | | ControlSample | $1.4 \times 10^5$ | $1.4 \times 10^5$ | |

TABLE 4

SilverCopper + Carrier 1 Hour Test

| Experimental Strain | Concentration of Inoculum Solution (cfu/mL) | Inoculum amount (mL) | | The average number of logarithmic values of the number of bacteria (cfu/cm2) obtained after different exposure times | | Kill Rate |
|---|---|---|---|---|---|---|
| | | | / | 0 hours | 1 hour | |
| Staphylococcus aureus | $1.4 \times 10^5$ | 0.2 | Sample | / | $1.3 \times 10^4$ | 90.71% |
| | | | ControlSample | $1.4 \times 10^5$ | $1.4 \times 10^5$ | |

TABLE 5

SilverCopper + Carrier 1 Hour Test

| Experimental Strain | Concentration of Inoculum Solution (cfu/mL) | Inoculum amount (mL) | | The average number of logarithmic values of the number of bacteria (cfu/cm2) obtained after different exposure times | | Kill Rate |
|---|---|---|---|---|---|---|
| | | | / | 0 hours | 3 hour | |
| Staphylococcus aureus | $6.2 \times 10^4$ | 0.2 | Sample | / | $6.0 \times 10^2$ | 99.54% |
| | | | ControlSample | $6.2 \times 10^4$ | $1.3 \times 10^5$ | |

TABLE 6

SilverCopper + Carrier 1 Hour Test

| Experimental Strain | Concentration of Inoculum Solution (cfu/mL) | The average number of logarithmic values of the number of bacteria (cfu/cm2) obtained after different exposure times | | | Kill Rate |
|---|---|---|---|---|---|
| | | / | 0 hours | 24 hour | |
| Staphylococcus aureus | $2.4 \times 10^5$ | | $2.4 \times 10^5$ | <50 | 99.98% |

Test results shows, the silver-copper antibacterial powder of the present application can achieve a microbial killing rate roughly equivalent to that of pure silver antibacterial powder, but because 22% of the silver is replaced by copper, the price is greatly reduced, which makes the final antibacterial powder Microbial products are more competitive.

Test Case 3

The silver-copper tungsten carbide coating prepared in Example 1 with a thickness of 200 μm was used, and a polytetrafluoroethylene coating with a thickness of 30 μm was covered on it, and a square of 5×5 cm was cut out to obtain a sample. The test bacteria is *Staphylococcus aureus*, and the test method is JIS Z 2801:2010. The test results are shown in Table 7 below.

TABLE 7

| Test Microorganisms | Concentration of viable bacteria at 0 hours after inoculation of the blank sample (cfu/mL) | Concentration of viable bacteria 24 hours after inoculation of the blank sample (cfu/mL) | Concentration of viable bacteria 24 hours after inoculation of antibacterial sample (cfu/mL) | Antibacterial Rate (%) |
|---|---|---|---|---|
| Staphylococcus aureus | $2.7 \times 10^5$ | $3.8 \times 10^5$ | <20 | >99.99 |

Test results shows, the silver-copper tungsten carbide of the present application is sterilized in a non-contact manner, and due to the presence of a polymer film covering the coating, it can prevent the silver/copper particles from spreading to the outside and causing unnecessary contamination.

It can be understood from the foregoing that although the specific examples of the present application are described for illustrative purposes, those skilled in the art can make various modifications or improvements without departing from the spirit and scope of the present application. These deformations or modifications should fall within the scope of the appended claims of this application.

What is claimed is:

1. An antimicrobial article containing silver-copper particles, characterized in that the antimicrobial article comprises substrate particles, positively charged silver particles and positively charged copper particles,
wherein the positively charged silver particles and the positively charged copper particles are became by the silver particles and the copper particles undergo a high velocity thermal spray, a high velocity plasma spray or a low velocity flame spray;
wherein the silver particles have a particle size of 15 μm to 50 μm and the copper particles have a particle size of 10 μm to 50 μm;
wherein the particle size ratio of the silver particles to the copper particles is 0.8 to 1.2, and the silver particles, the copper particles and the substrate particles are combined by means of semi-fused sintering;
wherein the semi-fused means that during a spraying process, only outer surface of silver and copper particles melts, while inner core part is still in solid form, such that electrons in the outermost layer of silver and copper particles is removed, thereby forming the positively charged silver particles and copper particles;
wherein the ratio of the number of silver particles to the copper particles is 40:60 to 95:5, and based on the total number of particles of the substrate particles, the silver particles and the copper particles, the silver particles and the sum of the copper particles is less than or equal to 10%;
wherein the positively charged silver particles and the positively charged copper particles inhibit microorganisms by the ion group electric field and without ions or particles released.

2. The antimicrobial article according to claim 1, wherein the silver particles have a particle size of 20 μm to 45 μm.

3. The antimicrobial article according to claim 1, wherein the copper particles have a particle size of 10 μm to 45 μm.

4. The antimicrobial article according to claim 1, wherein the particle number ratio of the silver particles to the copper particles is 50:50 to 95:5.

5. The antimicrobial article according to claim 1, wherein in the high velocity thermal spray and the high velocity plasma spray, the particle velocity is greater than 340 m/s, wherein in the low velocity flame spray, the particle velocity is less than or equal to 50 m/s.

6. The antimicrobial article according to claim 5, wherein the silver particles, the copper particles and the substrate particles are mixed together, and then form semi-fused bond by the high velocity thermal spray, the high velocity plasma spray or the low velocity flame spray.

7. The antimicrobial article according to claim 5, wherein the substrate particles are selected from the group consisting of nickel-based tungsten carbide, cobalt-based tungsten carbide, nickel-chromium chromium carbide, nickel-based alloys, cobalt-based alloys, and combinations thereof, and wherein the silver particles, the copper particles and the substrate particles are mixed together, and then form semi-fused bond by the high velocity flame spray or the high velocity plasma spray.

8. The antimicrobial article according to claim 5, wherein the substrate particles are selected from the group consisting of glass beads, calcium carbonate, ceramics, and combinations thereof, and wherein the silver particles, the copper particles and the substrate particles are mixed together, and then processed by the low velocity flame spray to form semi-fused bonding.

9. The antimicrobial article according to claim 1, further comprising a polymer film covering a coating; wherein the silver particles, the copper particles and the substrate particles are combined by means of semi-fused sintering to produce the coating, wherein the thickness of the polymer film is 0.5 μm to 60 μm.

10. The antimicrobial article according to claim 2, wherein the silver particles have a particle size of 25 μm to 40 μm.

11. The antimicrobial article according to claim 2, wherein the silver particles have a particle size of 28 82 m to 38 μm.

12. The antimicrobial article according to claim 3, wherein the copper particles have a particle size of 15 μm to 40 μm.

13. The antimicrobial article according to claim 3, wherein the copper particles have a particle size of 22 μm to 38 μm.

14. The antimicrobial article according to claim 4, wherein the particle number ratio of the silver particles to the copper particles is 55:45 to 90:10.

15. The antimicrobial article according to claim 4, wherein the particle number ratio of the silver particles to the copper particles is 60:40 to 80:20.

16. The antimicrobial article according to claim 1, wherein based on the total number of particles of the substrate particles, the silver particles and the copper particles, the silver particles and the sum of the copper particles is less than or equal to 8%.

17. The antimicrobial article according to claim 1, wherein based on the total number of particles of the substrate particles, the silver particles and the copper particles, the silver particles and the sum of the copper particles is less than or equal to 5%.

* * * * *